United States Patent [19]

Wanderscheid et al.

[11] Patent Number: 5,583,563
[45] Date of Patent: Dec. 10, 1996

[54] METHOD AND SYSTEM FOR DELIVERING AN APPLICATION IN AN INTERACTIVE TELEVISION NETWORK

[75] Inventors: Tammy M. Wanderscheid, Highland Ranch; Martin D. Siebring; Kurt P. Haldeman, both of Aurora, all of Colo.

[73] Assignee: US West Marketing Resources Group, Inc., Englewood, Colo.

[21] Appl. No.: 371,730

[22] Filed: Jan. 12, 1995

[51] Int. Cl.$^6$ .................................................. H04N 7/173
[52] U.S. Cl. .............................. 348/13; 348/10; 455/5.1
[58] Field of Search ................................ 348/7, 12, 13, 348/10, 468; 455/4.2, 5.1, 6.2, 6.3; 380/5, 10, 20; H04N 7/173, 7/16

[56] References Cited

U.S. PATENT DOCUMENTS

| | | | |
|---|---|---|---|
| 4,633,430 | 12/1986 | Cooper | 364/900 |
| 5,003,591 | 3/1991 | Kauffman et al. | 348/7 |
| 5,181,107 | 1/1993 | Rhoades | 348/13 |
| 5,388,211 | 2/1995 | Hornbuckle | 395/200 |
| 5,440,632 | 8/1995 | Bacon et al. | 348/12 |
| 5,446,490 | 8/1995 | Blahut et al. | 348/10 |

Primary Examiner—John K. Peng
Assistant Examiner—Chris Grant
Attorney, Agent, or Firm—Judson D. Cary

[57] ABSTRACT

A method is disclosed for dynamically transferring an application from a server to a client station in an interactive television network. The method begins with the step of storing an application engine in the memory of the client station. The method further includes the step of transmitting a signal from the client station to the server. The signal represents a request for an application. The method also includes the steps of downloading an application segment from the server to the client station and storing the application segment in the memory of the client station. Finally, the method includes the step of executing the control logic of the application segment. An apparatus is also disclosed for implementing the method.

18 Claims, 2 Drawing Sheets

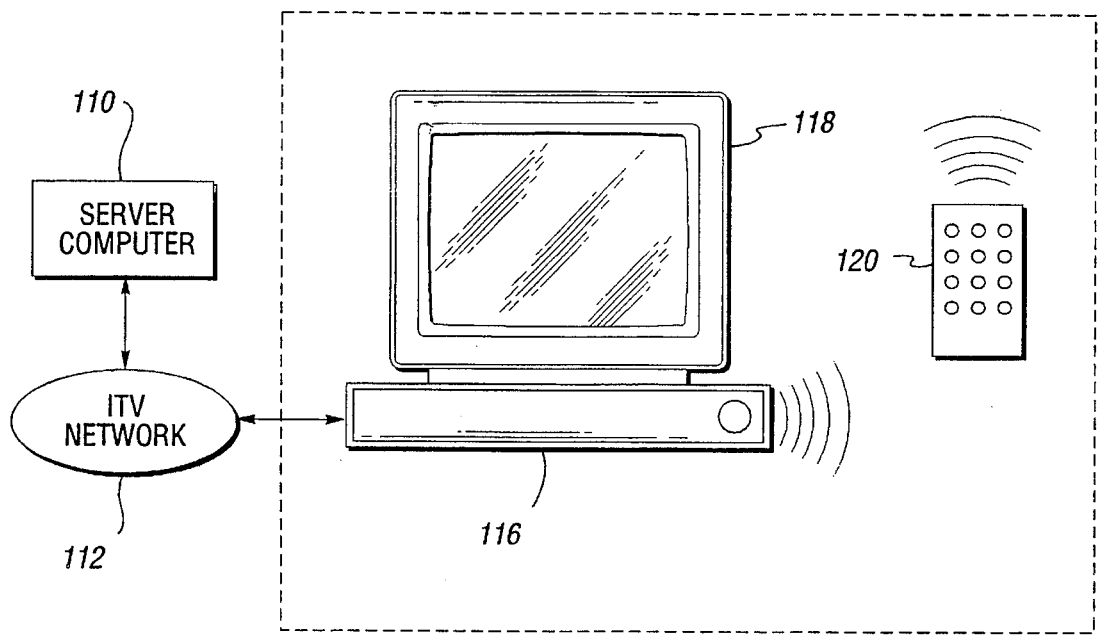
Fig. 1
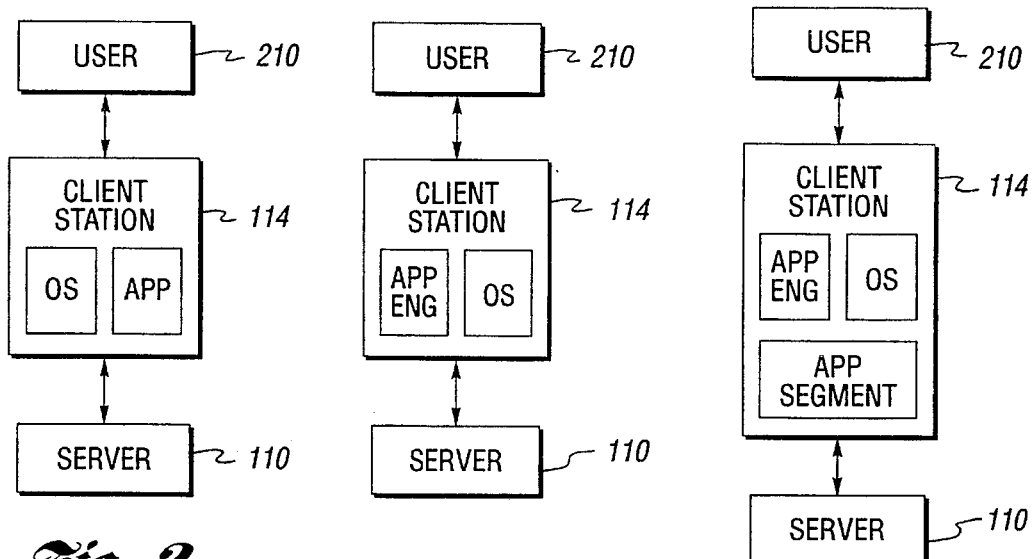
Fig. 2 (PRIOR ART)
Fig. 3a
Fig. 3b

METHOD AND SYSTEM FOR DELIVERING AN APPLICATION IN AN INTERACTIVE TELEVISION NETWORK

TECHNICAL FIELD

This invention relates generally to methods and systems for transmitting information over an interactive television network. In particular, this invention relates to methods and systems for dynamically transferring an application from a server to a client in an interactive television network.

BACKGROUND ART

Client-Server architectures have been successfully utilized in computer networks for many years. Recently, such architectures have been applied to cable television networks.

Using this architecture, the client station and the server of a client-server cable network must communicate with each other. Traditionally, this was accomplished, on the client side, using software which permanently resides in the memory of the client station. Such software includes a complete application as well as the underlying primitive input and output routines. This traditional approach results in a number of shortcomings, including:

Maintaining the application on the client station requires an interruption of service;

The application on the client station consumes limited and valuable station resources;

The user is limited to execution of only the application residing on the client station; and The application on the client station is in a format which can only be executed by the specific type of client station.

DISCLOSURE OF THE INVENTION

In view of the prior art, a need exists for an improved method and system for delivering an application to a client station in an interactive television network. More particularly, the improved method and system must overcome the shortcomings of the prior art.

The present invention described and disclosed herein comprises a method and system for delivering an application to a client station in an interactive television network.

It is an object of the present invention to promote efficient use of client station resources by storing a compact application engine at the client station which requests and controls the delivery of segments of an application to the client station from the server.

It is another object of the present invention to provide a method and system for delivering segments of an updated application to a client station without interrupting service.

It is yet another object of the present invention to provide a method and system for delivering segments of multiple applications to a client station.

In carrying out the above objects and other objects of the present invention, a method is provided for delivering an application segment of a first application from the server to the client. The method is for use in an interactive television network which includes a server and at least one client station. Each client station includes a processor, a memory and an input device, such as an infra-red remote controller.

The method begins with the step of storing an application engine in the memory of the client station. The method also includes the step of transmitting a signal from the client station to the server representing a request for the application segment. The request is preferably generated by a user using the input device.

The method continues with the step of downloading the application segment from the server to the client station. The application segment includes high-level control logic compatible with the application engine stored at the client station. The application segment is then stored in the memory of the client station. Finally, the method includes the step of executing the control logic of the application segment.

In further carrying out the above objects and other objects of the present invention, a system is also provided for carrying out the steps of the above described method.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein:

FIG. 1 is a schematic block diagram of the environment in which the present invention is used;

FIG. 2 is a schematic block diagram illustrating the contents of the memory of the client station according to the prior art;

FIG. 3a is a first schematic block diagram illustrating the contents of the memory of the client station prior to loading an application segment according to the present invention;

FIG. 3b is a second schematic block diagram illustrating the contents of the memory of the client station after loading an application segment according to the present invention;

BEST MODE FOR CARRYING OUT THE INVENTION

Figure 4:
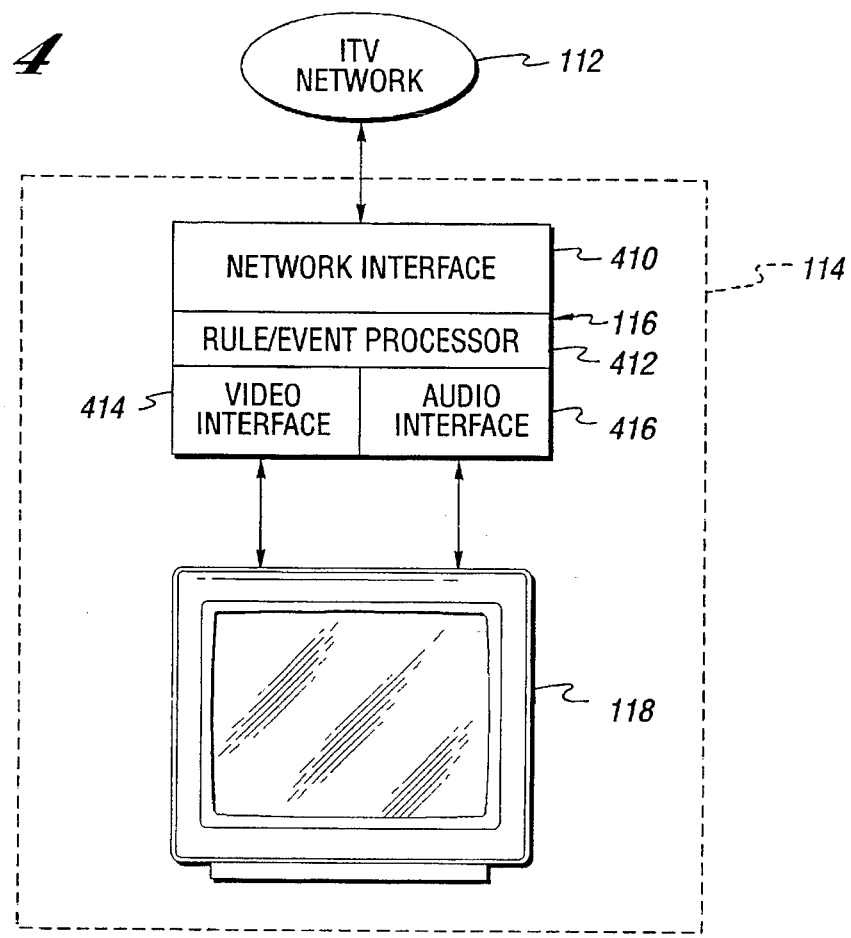
FIG. 4 is a block diagram illustrating the set top control logic components of the client station of the present invention.

Referring now to the drawings, FIG. 1 is a schematic block diagram illustrating an interactive television ("ITV") system for use with the present invention. The system includes an ITV server 110 for use with an ITV network 112. ITV server 110 is connected through ITV network 112 with client station 114.

In a first embodiment of the present invention, ITV server 110 is an SGI challenge series network server. The preferred client station of the first embodiment includes a Time-Warner full service network Home Communications Terminal 116. Time Warner Terminal 116 employs a MIPS R4000 chip running at 80–100 Mhz and incorporates Silicon Graphics Indigo Workstation components.

In a second embodiment of the present invention, ITV server 110 is a DEC Interactive Application Server ("IAS"). The preferred client station of the second embodiment includes a 3DO set top terminal 116. 3DO Terminal 116 employs a proprietary 3DO chip set.

In both the first and second embodiments, client station 114 also includes a television or monitor 118. Terminal 116 is designed to receive digital full-motion video, animation, graphics and audio data. Terminal 116 is further designed to convert this digital information into an analog signal for transmission to monitor 118. To provide the highest resolution, a video monitor is preferred, but a standard television is acceptable.

Client station 114 further includes an input device 120. Preferably input device 120 is an infrared remote control including a number of alpha-numeric keys. Alternatively, input device 120 could be an infrared mouse.

As those skilled in the art will recognize, the system of FIG. 1 is an interactive television network employing a client-server architecture. ITV server 110 provides mass storage and services to client station 114. Control logic resides at both server 110 and client station 114 to support the client-server architecture.

Referring now to FIG. 2, there is a block diagram illustrating the contents of the memory of client station 114 according to the prior art. In the prior art system, client station 114 is interfaced to server 110. This interface may be facilitated by a network (not shown in FIG. 2). Further, client station 114 is operated by user 210.

According to the prior art, the memory of client station 114 includes an operating system and a complete ITV application. The application of client station 114 includes basic routines for handling input from and output to server 110. The application of client station 114 further includes machine executable control logic for controlling the user interface and performing functions specified by the user.

FIG. 3a illustrates a system according to the present invention. Like the prior art systems, client station 114 is interfaced to server 110, and client station 114 is operated by user 210.

According to the present invention, the memory of client station 114 initially includes an operating system and an ITV application engine. Like the prior art, the operating system of client station 114 includes basic routines for handling input from and output to server 110.

The application engine of client station 114 is responsible for basic user interface as well as requesting and loading segments of the application which provide high level logic to accomplish functions specified by the user. FIG. 3b illustrates the memory of the system of the present invention after the application segment has been downloaded from server 110 to client station 114.

Using the application engine of the present invention allows the interactive television applications to be updated and maintained without interrupting the service to the client station 114. Because complete applications were resident in the prior art client stations, service to the client station was interrupted any time application maintenance was required. The present invention avoids this problem by storing the complete application at server 110 and delivering it in segments upon request to client station 114.

Further, the application engine of the present invention allows multiple applications to be executed at the same client station. Because the prior art client stations include a single complete application, the user was limited to the functionality of that resident application. The present invention, however, provides the user the facility to use a first application for certain features and a second application for other features. Further, because a requested application can be loaded in segments instead of its entirety, the application engine of the present invention can support multiple applications during a single session. A user, for example, may request two applications and switch back and forth between them at will.

Referring now to FIG. 4, there is a block diagram illustrating the control logic components of set top terminal 116. As illustrated, the control logic includes four major components: network interface 410, rule/event processor 412, video interface 414 and audio interface 416.

Network interface 410 is responsible for receiving and transmitting data over ITV network 112. Network interface 410 controls and manages the flow of audio, video and other data to and from client station 114. This component communicates with rule/event processor 412 through event messages such as beginning of data packet and data request messages.

Rule/event processor 412 is the control logic component which processes and manages events generated by the user or other component of the network. Examples of events handled by rule/event processor 412 include a remote control keystroke and receipt of a video clip from server 110.

Video interface 414 is responsible for processing and assembling the video data received through network interface 410 for presentation to the user. The processing performed by video interface 414, for example, might be as rudimentary as forwarding a continuous stream of digitized video to monitor 118, or as complex as clipping, assembling and delivering several video images to monitor 118.

Similarly, audio interface 418 is responsible for processing and assembling the audio data received through network interface 410 for presentation to the user. The processing performed by audio interface 414, for example, include forwarding a continuous stream of digitized audio to monitor 118, presenting memory-resident digitized sound bites based on messages received from rule/event processor 412 and modifying, combining and delivering several audio components to monitor 118.

Network interface 410, video interface 414 and audio interface 416 include primitive input/output routines used by typical interactive television applications. Rule/event processor 412 includes not only primitive routines used in event processing, but also rules, in the form of an application segment loaded from server 110.

The application segment is written in a high-level language which is interpreted by rule/event processor 412. By providing the application segment in a high-level language, the present invention supports device independence. In other words, any set-top terminal which includes an application engine compatible with the present invention can execute the application segment regardless of the set-top terminal manufacturer.

Figure 5:
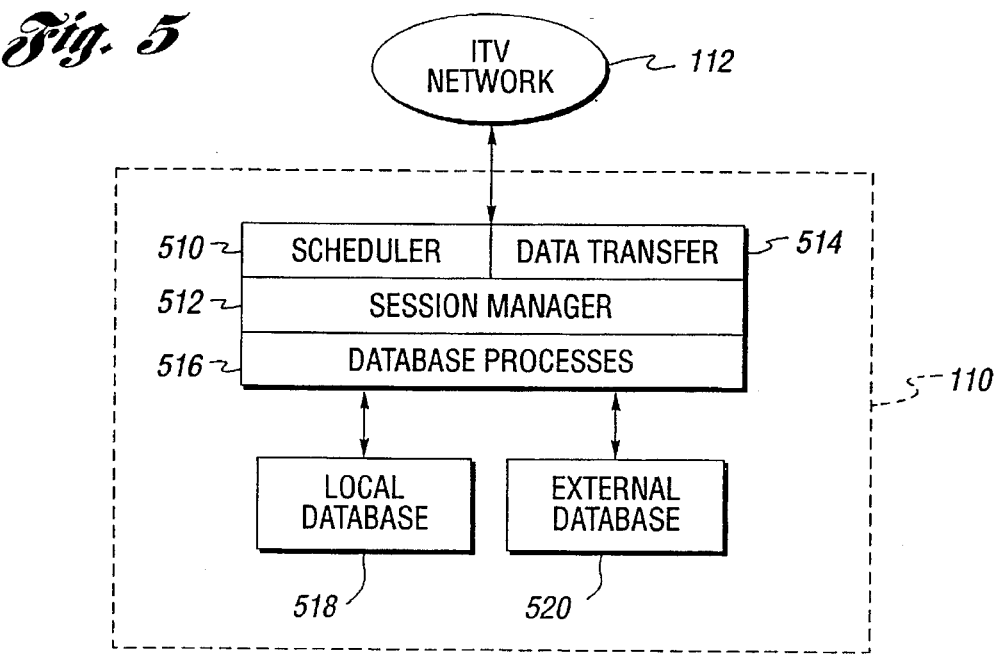
FIG. 5 is a block diagram illustrating the control logic components of the server of the present invention.

Referring now to FIG. 5, there is a block diagram illustrating the control logic components of server computer 110. As illustrated, the control logic includes four major components: scheduler 510, session manager 512, data transfer 514 and database processes 516.

Scheduler 510 is responsible for monitoring the processes of server 110 to ensure proper servicing of requests from client station 112. In the event a process is interrupted, scheduler 510 is responsible for diagnosing the problem and restarting the process.

Session manager 512 is the control logic component which manages connections and disconnections of client station 114. Session manager 512 monitors sessions to identify new connections and initializes a new session upon identifying a new connection. This component also reports server shut-downs to connected client stations. Session manager 512 further accumulates statistics such as keystroke and timestamp information for tracking client station usage and for billing.

Using the statistical information accumulated by session manager 512, the present invention can employ an anticipatory sequencer to enhance efficiency and lower response time. Using the statistics accumulated by session manager 512, scheduler 510 can perform pre-fetch operations prior to an actual request. For example, scheduler 510 request database information required for a feature which is likely to be requested by the user. Although it is preferable to store the statistics at server 110, similar statistics could be stored at client station 114 for similar purposes.

Data transfer component 514 is responsible for processing and delivering requested audio and video data to client station 114. Data transfer component 514 is further responsible for communicating with video interface 414 and audio interface 416 via messages transmitted using ITV network 112 and network interface 410.

Database processes component 516 is responsible for processing database requests received from client stations over ITV network 112. Database processes component 516 controls data on local database 518 and external database 520. The data stored on databases 518 and 520 is typically digitized audio and video data, but could include other types of data which may be requested by client station 114 such as statistical information or application data.

While the best mode for carrying out the invention has been described in detail, those familiar with the art to which this invention relates will recognize various alternative designs and embodiments for practicing the invention as defined by the following claims.

What is claimed is:

1. In an interactive television network including a server and a client station, the client station including a processor, a memory and an input device, a method for delivering an application segment of a first application from the server to the client, said application segment comprising logic, the method comprising:

storing an application engine in the memory of the client station;

transmitting a signal from the client station to the server representing a request for a first application segment of a first application;

downloading the first application segment from the server to the client station;

storing the first application segment in the memory of the client station; and executing logic in the first application segment.

2. The method of claim 1 further including the steps of:

transmitting a signal from the client station to the server representing a request for an application asset;

downloading the application asset from the server to the client station; and storing the application asset in the memory of the client station.

3. The method of claim 1 further including the steps of:

transmitting a signal from the client station to the server representing a request for application data;

downloading the application data from the server to the client station; and storing the application data in the memory of the client station.

4. In an interactive television network including a server and a client station, the client station including a processor, a memory and an input device, a method for delivering an application segment of a first application from the server to the client, the method comprising:

storing an application engine in the memory of the client station;

transmitting a signal from the client station to the server representing a request for a first application segment of a first application;

downloading the first application segment from the server to the client station;

storing the first application segment in the memory of the client station; and executing the first application segment, wherein the application engine tracks the usage of the first application.

5. In an interactive television network including a server and a client station, the client station including a processor, a memory and an input device, a method for delivering an application segment of a first application from the server to the client, the method comprising:

storing an application engine in the memory of the client station;

transmitting a signal from the client station to the server representing a request for a first application segment of a first application;

downloading the first application segment from the server to the client station;

storing the first application segment in the memory of the client station; and executing the first application segment, wherein the application engine anticipates requirements of the first application using statistical analysis.

6. The method of claim 1 wherein the logic in the first application segment is in a high-level language.

7. In an interactive television network including a server and a client station, the client station including a processor, a memory and an input device, a method for delivering a plurality of application segments of a plurality of applications from the server to the client, each application segment comprising logic, the method comprising:

storing an application engine in the memory of the client station;

transmitting a signal from the client station to the server representing a request for a first application segment of a first application;

downloading the first application segment from the server to the client station;

storing the first application segment in the memory of the client station;

executing logic in the first application segment;

transmitting a signal from the client station to the server representing a request for a second application segment of a second application;

downloading the second application segment from the server to the client station;

storing the second application segment in the memory of the client station; and executing logic in the second application segment.

8. The method of claim 7 further including the steps of:

receiving a signal indicating a user request to switch between the first and second applications;

suspending execution of the second application segment; and executing logic in the first application segment.

9. The method of claim 7 further including the step of:

freeing the memory in which the first application segment is stored.

10. A client station for use in an interactive television network including a server, the client station including a processor, a memory, an input device, and an application engine in the memory having control logic for receiving and executing an application segment from the server, the application engine control logic performing the steps of:

transmitting a signal from the client station to the server representing a request for a first application segment of a first application;

downloading the first application segment from the server to the client station;

storing the first application segment in the memory of the client station; and executing logic in the first application segment on the client station.

11. The client station of claim 10 wherein the first application segment logic performs the steps of:

transmitting a signal from the client station to the server representing a request for an application asset;

downloading the application asset from the server to the client station; and storing the application asset in the memory of the client station.

12. The client station of claim 10 wherein the first application segment logic performs the steps of:

transmitting a signal from the client station to the server representing a request for application data;

downloading the application data from the server to the client station; and storing the application data in the memory of the client station.

13. A client station for use in an interactive television network including a server, the client station including a processor, a memory, an input device, and control logic for receiving and executing an application segment from the server, the control logic performing the steps of:

storing an application engine in the memory of the client station;

transmitting a signal from the client station to the server representing a request for a first application segment of a first application;

downloading the first application segment from the server to the client station;

storing the first application segment in the memory of the client station; and executing the first application segment, wherein the application engine tracks the usage of the first application.

14. A client station for use in an interactive television network including a server, the client station including a processor, a memory, an input device, and control logic for receiving and executing an application segment from the server, the control logic performing the steps of:

storing an application engine in the memory of the client station;

transmitting a signal from the client station to the server representing a request for a first application segment of a first application;

downloading the first application segment from the server to the client station;

storing the first application segment in the memory of the client station; and executing the first application segment, wherein the application engine anticipates the resource requirements of the first application using statistical analysis.

15. The client station of claim 10 wherein the first application segment is in a high-level language.

16. A client station for use in an interactive television network including a server, the client station including a processor, a memory, an input device, and an application engine in the memory having control logic for receiving and executing a plurality of application segments from a plurality of application on the server, the application engine control logic performing the steps of:

transmitting a signal from the client station to the server representing a request for a first application segment of a first application;

downloading the first application segment from the server to the client station;

storing the first application segment in the memory of the client station;

executing logic in the first application segment;

transmitting a signal from the client station to the server representing a request for a second application segment of a second application;

downloading the second application segment from the server to the client station;

storing the second application segment in the memory of the client station; and executing logic in the second application segment.

17. The client station of claim 16 further including application engine control logic for performing the steps of:

receiving a signal indicating a user request to switch between the first and second applications;

suspending execution of the second application segment; and executing the first application segment.

18. The client station of claim 16 further including application engine control logic for performing the step of:

freeing the memory in which the first application segment is stored.

* * * * *